(12) United States Patent
Sadwick (10) Patent No.: US 9,516,722 B2
(45) Date of Patent: Dec. 6, 2016

(54) POWER QUALITY ENHANCEMENT (71) Applicant: Laurence P. Sadwick, Salt Lake City, UT (US)

(72) Inventor: Laurence P. Sadwick, Salt Lake City, UT (US)

(*) Notice: Subject to any disclaimer, the term of this patent is extended or adjusted under 35 U.S.C. 154(b) by 406 days.

(21) Appl. No.: 14/104,972

(22) Filed: Dec. 12, 2013

(65) Prior Publication Data

US 2014/0159648 A1 Jun. 12, 2014

Related U.S. Application Data (60) Provisional application No. 61/736,080, filed on Dec. 12, 2012.

(51) Int. Cl.
| | |
|---|---|
| *H02M 7/06* | (2006.01) |
| *H05B 37/00* | (2006.01) |
| *H02M 1/42* | (2007.01) |
| *H02M 7/10* | (2006.01) |
| *H05B 33/08* | (2006.01) |
| *H05B 41/28* | (2006.01) |
| *H02J 7/02* | (2016.01) |

(52) U.S. Cl.
CPC .......... *H05B 37/00* (2013.01); *H02M 1/4266* (2013.01); *H02M 7/103* (2013.01); *H05B 33/0815* (2013.01); *H05B 41/28* (2013.01); *H02J 7/022* (2013.01); *Y02B 70/123* (2013.01)

(58) Field of Classification Search
CPC ....................................................... H02M 7/06
See application file for complete search history.

(56) References Cited

U.S. PATENT DOCUMENTS

| | | | | |
|---|---|---|---|---|
| 5,208,515 A | * | 5/1993 | Lee ..................... | H05B 41/2925 315/219 |
| 6,753,651 B1 | * | 6/2004 | Goral ...................... | H02J 9/065 307/64 |
| 2007/0217093 A1 | * | 9/2007 | Xue ......................... | H02M 1/10 361/18 |
| 2008/0079568 A1 | * | 4/2008 | Primous ............. | H05B 37/0218 340/541 |

* cited by examiner

*Primary Examiner* — Emily P Pham
(74) *Attorney, Agent, or Firm* — Hamilton DeSanctis & Cha (57) ABSTRACT

A power supply includes an alternating current input, a rectifier operable to generate a rectified signal based on the alternating current input, a voltage multiplier operable to generate a multiplied voltage based on the alternating current input, and an output operable to yield an electrical current based on the rectified signal from the rectifier and on the multiplied voltage from the voltage multiplier. The rectified signal from the rectifier is connected to the output when a voltage of the rectified signal is higher than the multiplied voltage, and the multiplied voltage from the voltage multiplier is connected to the output when the multiplied voltage is higher than the voltage of the rectified signal.

19 Claims, 7 Drawing Sheets

POWER QUALITY ENHANCEMENT

BACKGROUND

Electricity is typically generated and distributed in alternating current (AC) form, wherein the voltage varies sinusoidally between a positive and a negative value. However, many electrical devices require a direct current (DC) supply of electricity having a constant voltage level or constant current level, or at least a supply that remains positive even if the level is allowed to vary to some extent. In one type of commonly used power supply for loads such as an LED, an incoming AC voltage is connected to the load and current is drawn only during certain portions of the sinusoidal waveform. For example, a fraction of each half cycle of the waveform may be used by connecting the incoming AC voltage to the load each time the incoming voltage rises to a predetermined level or reaches a predetermined phase and by disconnecting the incoming AC voltage from the load each time the incoming voltage again falls to zero or capacitors that are used in the power supply circuit may charge only near the peak of, for example, the rectified AC input voltage. In this manner, a positive but reduced voltage may be provided to the load. This type of conversion scheme often results in a 'peak' region, often being a relatively narrow peak region, in the AC current drawn from the AC source as a percentage of the AC cycle often occurring at the peak/maximum of the AC voltage. This type of AC current waveform and profile is often highly undesirable due to the poor power factor and high total harmonic distortion (THD) generated by and associated with such a current waveform and profile.

SUMMARY

The driver disclosed herein provides power for any type of load, including lights such as light emitting diodes (LEDs) of any type including, for example, organic light emitting diodes (OLEDs). A voltage increasing circuit is active during a portion of an output waveform to more closely approximate a desired waveform. In some embodiments this may be used to decrease total harmonic distortion.

This summary provides only a general outline of some particular embodiments. Many other objects, features, advantages and other embodiments will become more fully apparent from the following detailed description.

BRIEF DESCRIPTION OF THE DRAWINGS

A further understanding of the various embodiments of the present invention may be realized by reference to the figures which are described in remaining portions of the specification. In the figures, like reference numerals may be used throughout several drawings to refer to similar components.

DESCRIPTION

The power quality enhancement system disclosed herein provides enhanced power quality from multiple paths, providing power from sources such as AC line voltage sources for use in powering any electronic circuits or devices especially those with low power quality such as low power factor or high THD. The power output in some embodiments from the multiple path system is a rectified waveform that can optionally be filtered to yield a direct current output. The power sources are not limited to any particular source. In some embodiments, the power source can have a fixed or universal range of AC input voltages including 47 to 63 Hz (i.e., 50 and/or 60 Hz) and 400 Hz, etc. The multiple power paths may be used to provide power to internal circuits in a dimmable LED driver, such as the various dimmable LED drivers and their variations disclosed in U.S. patent application Ser. No. 12/422,258, filed Apr. 11, 2009 for a "Dimmable Power Supply", which is incorporated herein by reference for all purposes. In some embodiments, power may be provided to charge one or more batteries or other energy storage devices. By a judicious choice of components, power factor and THD enhancements can be tailored to meet the specifics of the applications.

Power may be obtained from sources such as but not limited to an AC or DC line, a tag-along inductor that inductively couples to another inductor in an electrical circuit, a battery, solar cells, photovoltaics, vibrational, heat, mechanical, sources, etc.

When used to power a light such as an LED of any type, the driver draws an alternating current (AC) current from an AC source to provide a direct current (DC) supply of electricity with a constant voltage level or constant current level, or at least a supply that remains positive even if the level is allowed to vary to some extent. For example, light emitting diodes (LEDs) and similar devices such as organic light emitting diodes (OLEDs) are being increasingly considered for use as light sources in residential, commercial and municipal applications. However, in general, unlike incandescent light sources, LEDs and OLEDs cannot be powered directly from an AC power supply unless, for example, the LEDs are configured in some back to back formation. Electrical current flows through an individual LED easily in only one direction, and if a negative voltage which exceeds the reverse breakdown voltage of the LED is applied, the LED can be damaged or destroyed. Furthermore, the standard, nominal residential voltage level is typically something like 120 V or 240 V, both of which are often higher than may be desired for a high efficiency LED light. Some conversion of the available power may therefore be necessary or highly desired with loads such as an LED light.

In one type of commonly used power supply for loads such as an LED, an incoming AC voltage is connected to the load and current is drawn only during certain portions of the sinusoidal waveform. For example, a fraction of each half cycle of the waveform may be used by connecting the incoming AC voltage to the load each time the incoming voltage rises to a predetermined level or reaches a predetermined phase and by disconnecting the incoming AC voltage from the load each time the incoming voltage again falls to zero or capacitors that are used in the power supply circuit may charge only near the peak of, for example, the rectified AC input voltage. In this manner, a positive but reduced voltage may be provided to the load. This type of conversion scheme often results in a 'peak' region, often being a relatively narrow peak region, in the AC current drawn from the AC source as a percentage of the AC cycle often occurring at the peak/maximum of the AC voltage.

Figure 1:
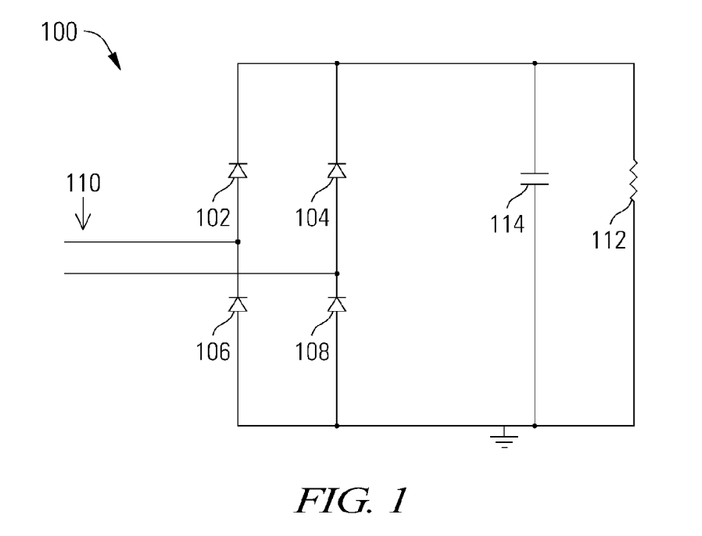
FIG. 1 depicts a schematic diagram of a simple AC to DC power converter.
Figure 7:
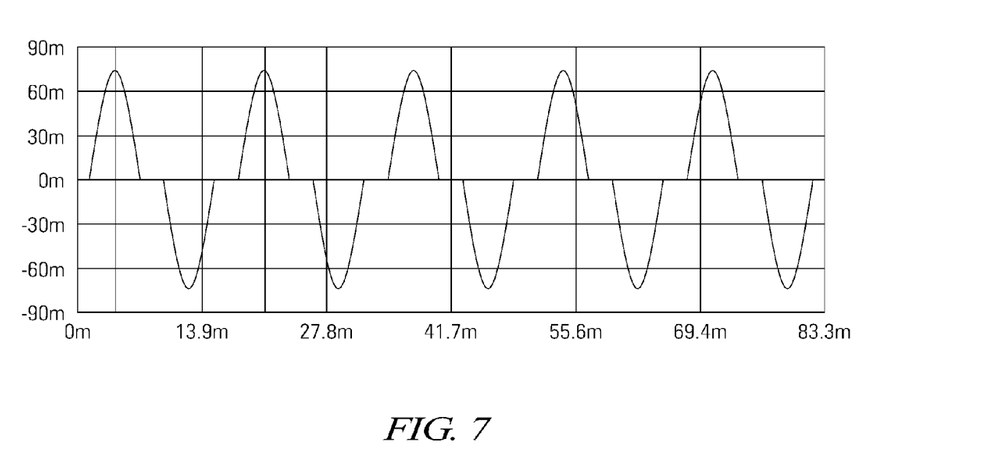
FIG. 7 depicts a plot of AC input current of a dimmable or, in a similar non-dimmable, LED driver with a relatively high LED forward voltage supplied with a 60 Hz AC input voltage without the embodiments of the present invention.

An example of a relatively simple circuit 100 with such an AC current waveform is shown in FIG. 1. A diode bridge or rectifier including diodes 102, 104, 106, 108 rectifies current from an AC input 110, powering a load 112, with optional filtering by capacitor 114. FIG. 7 shows the associated AC current waveform for a typical simple circuit as depicted in FIG. 1. This type of AC current waveform and profile is often highly undesirable due to the poor power factor and high total harmonic distortion (THD) generated by and associated with such a current waveform and profile. In many cases such a current waveform/profile is no longer considered acceptable by agency standards and regulations and products including new products must be made to conform to a certain level of power quality including a minimum allowable power factor and a maximum allowable THD. In addition, many power supplies, lighting drivers including, but not limited to, LED drivers, fluorescent lamp (FL) and compact fluorescent lamp (CFL) ballasts, battery chargers, etc. are required to adhere and meet these standards and regulations. For lighting applications, this type of conversion scheme in which AC is converted to DC is often controlled so that a constant current is provided to the load even if the incoming AC voltage varies. However, if this type of power supply, and, often, other types of power supplies, with current control is used in an LED light fixture or lamp, the power factor and/or total harmonic distortion (THD) may be adversely affected and impacted especially for a relatively high LED forward voltage. In addition, a conventional dimmer is often ineffective or impaired in use and operation with such a poor power quality AC to DC converter. For example, for many LED power supplies, the power supply will attempt to maintain the constant current through the LED despite a drop in the incoming voltage by increasing the on-time during each cycle of the incoming AC wave.

Figure 2:
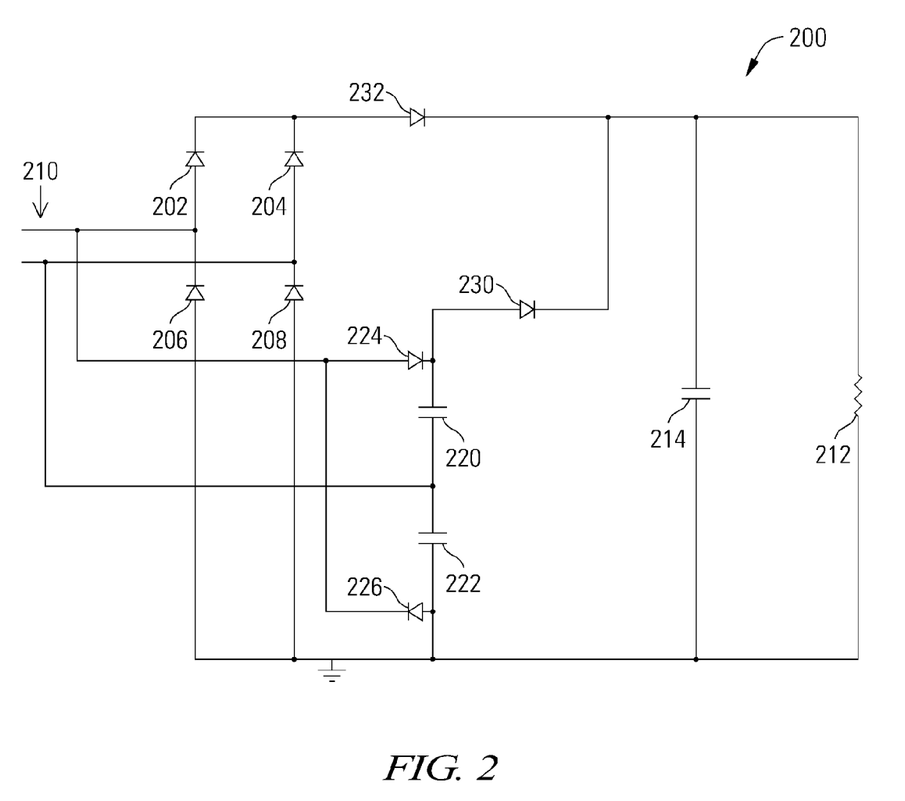
FIG. 2 depicts a schematic diagram of a simple AC to DC to power converter modified with a voltage doubler in accordance with some embodiments of the invention.

FIG. 2 depicts a schematic diagram of a simple AC to DC power converter 200 modified with a voltage doubler in accordance with some embodiments of the invention. The term "voltage doubler" is used herein to refer to a circuit that draws current from an input to an output, such as the voltage doubler consisting of capacitors 220, 222 and diodes 224, 226. The term "voltage doubler" does not imply herein that an output voltage is exactly twice the input voltage including over the complete AC cycle. In some embodiments of the present invention, the "voltage doubling" may be significantly different (e.g., less) than double the input voltage.

Figure 9:
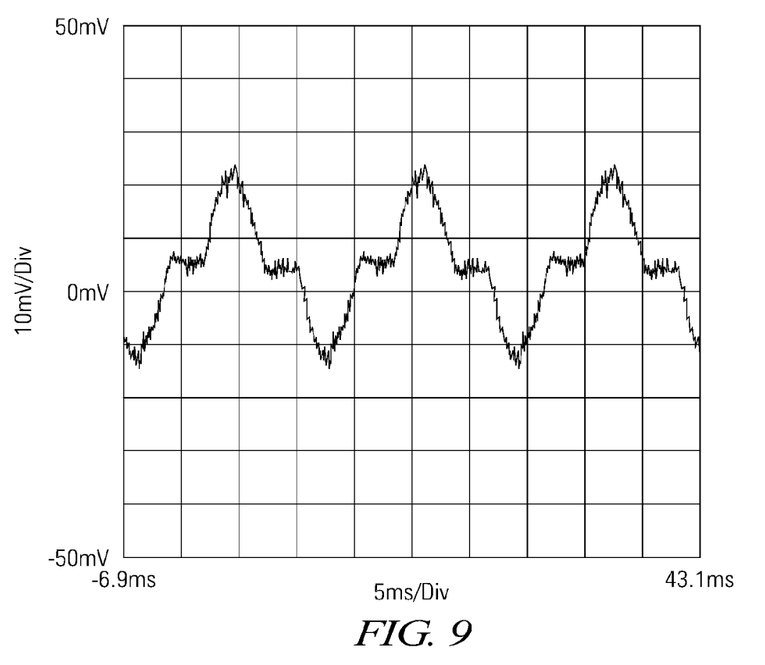
FIG. 9 shows a measurement of a dimming or non-dimming driver similar to the block diagram and schematic of FIGS. 6 and 8, respectively, without the present invention incorporated.

The power converter powers a load (e.g., capacitor 214 and resistor 212) using a voltage rectifier (e.g., diodes 202, 204, 206, 208) from power source 210. If the output voltage or current is regulated or controlled by switching the power converter to the load at peaks in the input waveform, then portions of the input waveform as shown in FIGS. 7 and 9 are omitted, such as the rising and falling edges, also referred to herein as the slopes, and the input current is no longer a sinusoidal waveform. A voltage doubler such as that including capacitors 220, 222 and diodes 224, 226 acts to fill the missing slopes somewhat to more nearly approximate the desired sinusoidal waveform, producing input current waveforms such as those shown in FIGS. 10 and 11. Diodes 230 and 232 are optional and can be used to block the lower of the respective full wave diode rectifier and voltage doubler voltages. Although passive and/or active methods can be used in the present invention, by a judicious and careful choice of component values, the circuits depicted in FIGS. 2, 4 and 5 can be designed and implemented such that the circuit automatically passively switches from the voltage doubler supplied path power to the diode bridge supplied path power such that the overall AC current waveform is increased to cover more of the AC cycle resulting in either or both an increased, larger power factor and/or a decreased, lower THD.

If a control system is used to regulate the output voltage and/or current by switching the connection between the power converter and the load, the control system can monitor the output voltage and/or current and adjust the switching to take into account the additional current from the voltage doubler. In this way, the desired output voltage and/or current levels are maintained, while the input current waveform more nearly approximates a sinusoidal waveform. In some embodiments, this may be applied to reduce total harmonic distortion.

The capacitance of capacitors 220, 222 is selected in some embodiments to be small enough that the voltage doubler is active mainly at low currents to fill in the missing slopes of the input current sinusoidal waveform, but to be substantially inactive at peak current levels. In other embodiments, the missing slopes in the input current sinusoidal waveform may be filled in by a current source that is switched on to fill in the missing slopes and switched off at peak current levels.

Figure 3A:
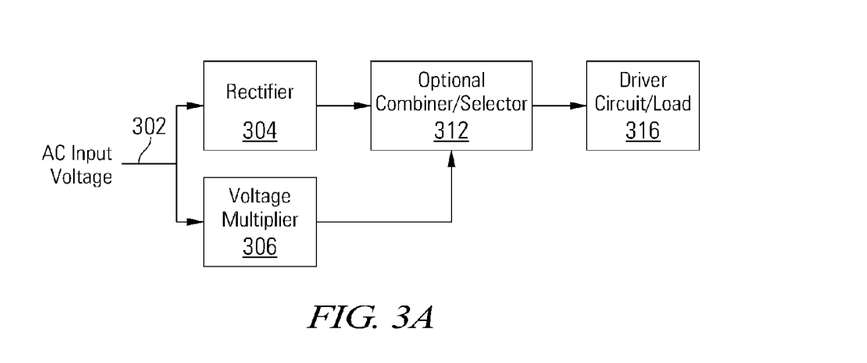
FIGS. 3A, 3B, 3C are block diagrams of a simple AC to DC power converter modified with a voltage doubler and other types of DC to DC converters, LED drivers, FL and CFL ballasts, lighting power supply, power supply, battery charger, etc. in accordance with some embodiments of the invention.
Figure 3B:
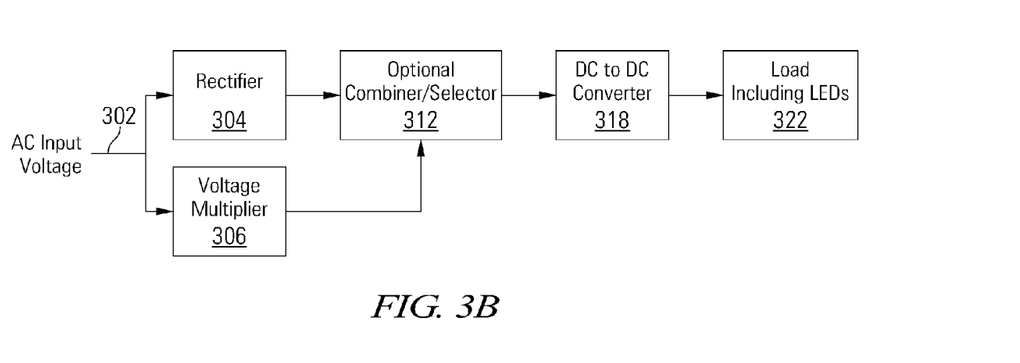
Figure 3C:
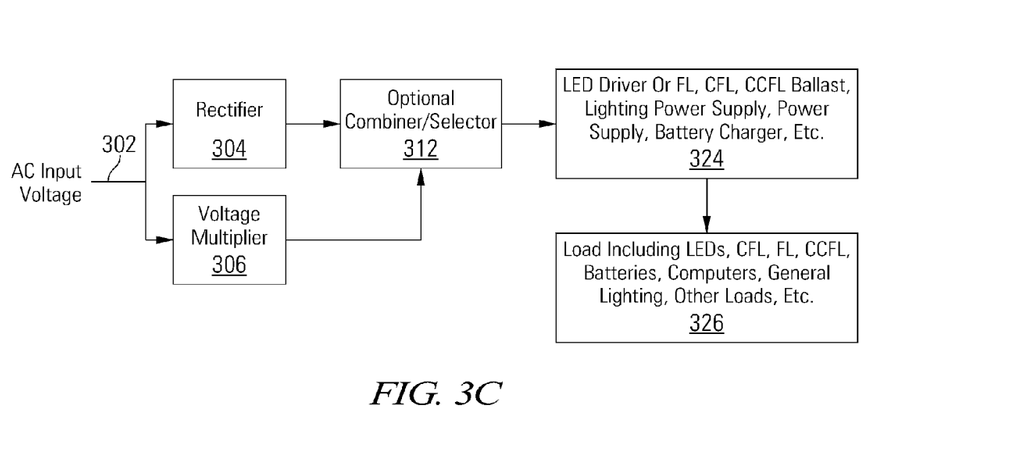

FIGS. 3A, 3B, 3C depict various block diagrams for some of the embodiments of the present invention. As shown in FIG. 3A, the AC input 302 can be provided to a rectifier 304 and voltage multiplier 306, with the resulting voltage(s) provided to an optional combiner/selector 312. The combiner/selector 312 is operable to select either the voltage from the rectifier 304 or from the voltage multiplier 306 to provide to a driver circuit and/or load 316. In some embodiments, the combiner/selector 312 is operable to combine the voltages from the rectifier 304 and the voltage multiplier 306 to provide to the driver circuit and/or load 316, for example switching between the two based on the voltage level from the rectifier 304 to provide a multiplied or increased voltage level when the voltage from the rectifier 304 is lower than desired. As shown in FIG. 3B, in some embodiments the power from the combiner/selector 312 is provided to a DC to DC converter 318 to regulate voltage and/or current provided to a load 322 at a desired fixed or varying level. As shown in FIG. 3C, in some embodiments the power from the combiner/selector 312 is provided to one or more other power related circuits 324, such as a driver for lighting devices or other loads, such as, but not limited to, an LED driver, a ballast or other power supply for a fluorescent lamp, compact fluorescent lamp (CFL), cold-cathode fluorescent lamps (CCFLs), neon lamps or other lighting device, or to a power supply, battery charger, etc. Such power related circuits 324 can be used to power any suitable load or loads 326.

Figure 4:
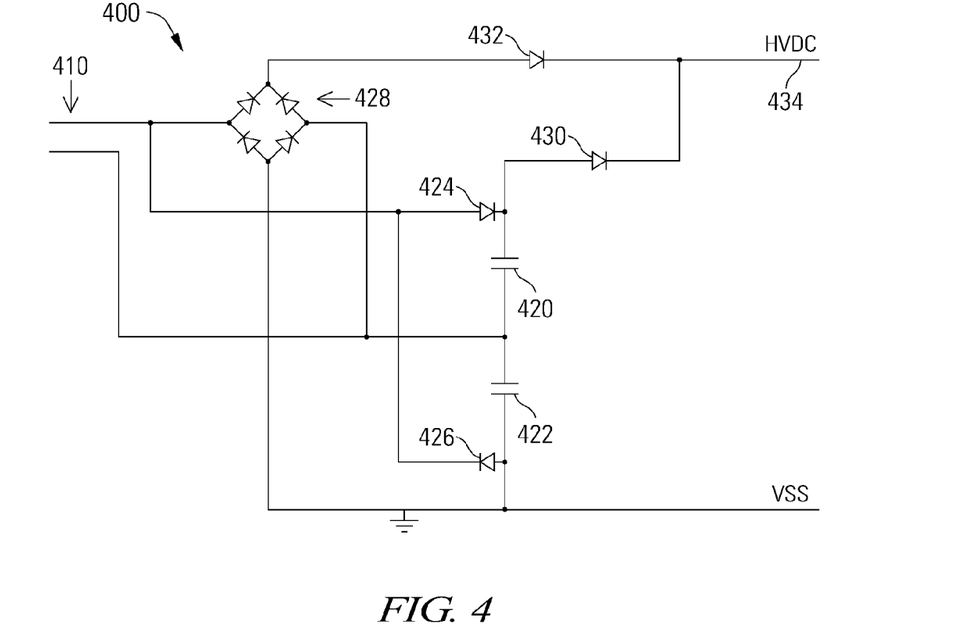
FIG. 4 depicts a schematic of one example circuit implementation with the optional diodes D47 and D50 that can be applied to, for example, the circuits of FIGS. 1, 6 and 8 in accordance with some embodiments of the invention.
Figure 5:
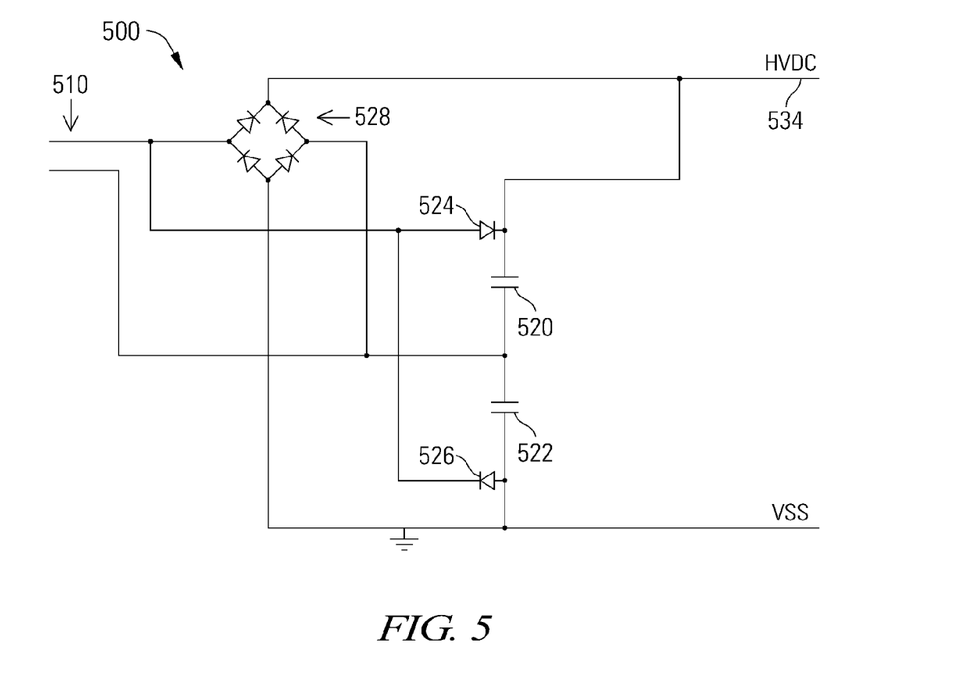
FIG. 5 depicts a schematic of one example circuit implementation without the optional diodes that can be applied to, for example, the circuits of FIGS. 1, 6 and 8 in accordance with some embodiments of the invention.

The present invention can be designed and implemented such that the voltage multiplier, in the case shown and illustrated in FIGS. 2, 4, and 5, a voltage doubler, is only active over a portion of the AC cycle with such portion being before the peak in the AC voltage thus aiding in filling in the AC input current input waveform. As the AC current can be represented as a Fourier series of sine waves, the goal is to reduce the amplitudes of the harmonics associated with the Fourier series. This can be accomplished, for example, by designing the voltage multiplier such that the current from the voltage multiplier merges with the current from, for example, the high forward voltage LED driver. Although the present invention is applicable to many types of power supplies, drivers, ballasts, battery chargers, etc. including ones using, for example, boost-buck, buck-boost, boost, buck, isolated, non-isolated, flyback, SEPIC, Cuk, forward-converters, etc., the present invention is especially applicable to buck converters and related circuits, approaches, and topologies, etc.

FIGS. 4 and 5 depict examples of the present invention using a voltage multiplier—in this case a voltage doubler designed to support voltage doubling over a defined portion of the AC cycle. Turning to FIG. 4, an AC to DC power converter 400 includes a voltage doubler in accordance with some embodiments of the invention. A voltage doubler consisting of capacitors 420, 422 and diodes 424, 426 draws power from AC input 410 and adds or combines the output with the output of rectifier 428 over a portion of the AC cycle at high voltage DC (HVDC) output 434. Diodes 430 and 432 block the lower of the respective full wave diode rectifier and voltage doubler voltages, passing the higher of the two voltages to output 434 at any given portion of the AC cycle. The component values are selected in some embodiments so that the circuit automatically passively switches from the voltage doubler supplied path power to the diode bridge supplied path power such that the overall AC current waveform is increased to cover more of the AC cycle resulting in either or both an increased, larger power factor and/or a decreased, lower THD. Turning to FIG. 5, in some embodiments the blocking diodes are omitted in AC to DC power converter 500. A voltage doubler consisting of capacitors 520, 522 and diodes 524, 526 draws power from AC input 510 and adds or combines the output with the output of rectifier 528 over a portion of the AC cycle at high voltage DC (HVDC) output 534. The component values are selected in some embodiments so that the circuit automatically passively switches from the voltage doubler supplied path power to the diode bridge supplied path power such that the overall AC current waveform is increased to cover more of the AC cycle resulting in either or both an increased, larger power factor and/or a decreased, lower THD.

Although two power paths (i.e., the full wave diode bridge and the voltage doubler) are illustrated in the example drawings contained herein, in general, N power paths connected to a source such as an AC voltage may be used where N is greater than 1 (i.e., N=2, 3, 4, etc.). These N paths can be voltage doublers, triplers, multipliers, etc. including multiple (i.e., more than one each) voltage doublers or triplers, quadruplers, multipliers, etc. with different configurations or components, component values, etc.

Figure 6:
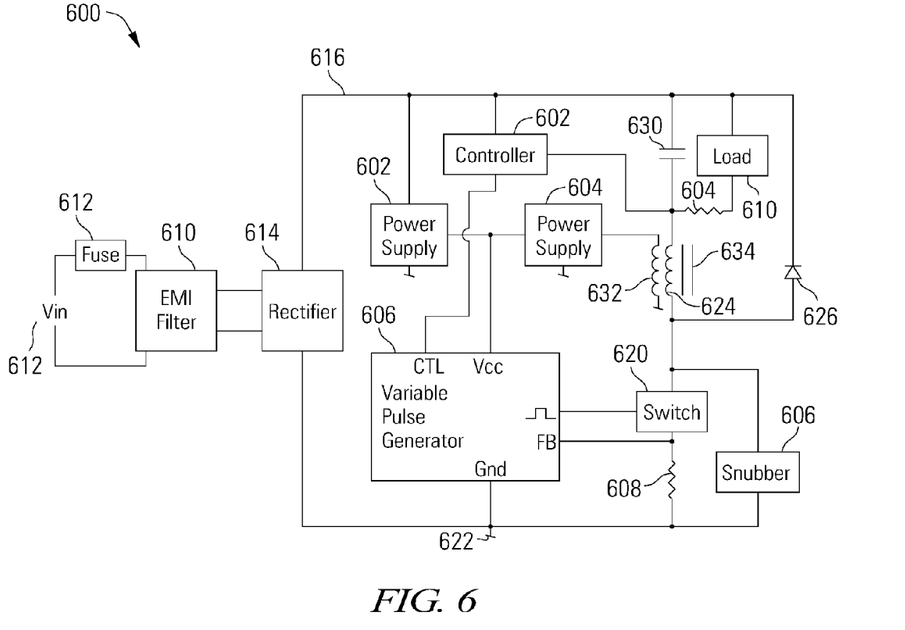
FIG. 6 depicts a block diagram of a dimmable LED driver with multiple power sources, including a low side tag-along inductor for which FIG. 4 or 5 can be applied to the present invention.

Turning to FIG. 6, an embodiment of a dimmable LED driver 600 is shown in which rectifier 614 comprises a circuit such as those depicted in FIGS. 4 and 5, powering a load 610 as well as internal devices and circuits such as a variable pulse generator 606, while allowing multiple power paths for power quality enhancement. The term "power source" is used herein to refer to the origin of a voltage or current, in contrast to a circuit such as a voltage regulator that may scale, limit or otherwise process the voltage and/or current levels obtained from the power source. Examples of power sources include but are not limited to AC and/or DC lines, tag-along inductors, transformers, batteries, energy harvesting sources such as solar, photovoltaic, mechanical, vibrations, wireless, etc.

Some embodiments of the present invention can use synchronous transistors including field effect transistors (FETs) (e.g., MOSFETs, JFETs, Gallium Nitride-based FETs (GaNFETs), Silicon Carbide FETs (SiCFETs), diamond FETs, etc.) and/or bipolar junction transistors (BJTs) including Darlington transistors and pairs in place of diode(s) including for the diode bridges and multiplier (i.e., doubler, tripler, quadrupler, etc.) diodes and others, etc.

The dimmable LED driver 600 powers and controls a load 610 such as one or more LED lights, from a power source such as an AC input 612. A rectifier 614 may be used to convert the AC input 612 and provide a DC signal to a DC rail 616. A switch 620 is controlled by the variable pulse generator 606, blocking or allowing current to flow from the DC rail 616 to a return rail 622 through the switch 620. As current flows through the switch 620, it also flows through a series inductor 624, storing energy in the inductor 624. When the switch 620 is turned off by the variable pulse generator 606, the inductor 624 releases energy, which circulates through a diode 626 and through the load 610. As will be understood by those of ordinary skill in the art, other components may be included such as capacitor 630 illustrated in parallel with load 610, and other devices to facilitate the desired functionality in the dimmable LED driver 600. In other embodiments, the load may consist of one or more capacitors in parallel with the LED(s), etc. In other embodiments and applications, the load may consist of things other than LEDs, OLEDs, etc., such as, but not limited to resistive, capacitive, inductive, reactive, etc. and/or combinations of the these, etc.

The first power source 602 draws power from the DC rail 616, regulating or dividing or otherwise setting the voltage level at an appropriate level, for example, for the variable pulse generator 606. The second power source 604 draws power from an inductor 632 adjacent the main inductor 624, inductively coupling power flowing through the main inductor 624 into the power source 604.

The inductor 632 may be located adjacent to the main inductor 624 in any suitable manner, for example by winding the inductor 632 around or along with the inductor 624. The inductors 624 and 632 may share a core 634, and the relative placement of the windings of inductors 624 and 632 and the core 634 is not limited to any particular arrangement.

The inductor 632 may be wound with an opposite polarity. When wound with one polarity, when the voltage and current in the inductor 624 is limited and, for example, the LED power supply/driver is either in constant current or voltage mode, the voltage from the power source 604 is constant. When wound with the other polarity, the inductor 632 and power source 604 are in the forward mode, and when the input voltage at DC rail 616 goes up, the voltage from the power source 604 goes up. Additional power may be supplied from other sources such as snubbers and clamps, including non-dissipative snubbers and clamps, and other types of energy storage devices and components including but not limited to inductors or capacitors of any type and combinations of these. As mentioned above, batteries, solar cells, photovoltaics, vibrational, mechanical, heat, thermal, wired, wireless, RF, etc. sources of energy may also be used with the present invention.

As disclosed above, the multiple power paths are not limited to use in any particular application. In other example embodiments of dimmable LED drivers, a controller measures the load current through a sense resistor, and controls a variable pulse generator based in part upon the load current. In some versions a level shifter or isolator may be included and may be used to feed the signal from the sense resistor to the controller or a sense transformer or other such device may be used as well as transistors to convey information about the current through the load. Other embodiments of the present invention may use other methods to sense current (and/or voltage and/or power) including, but not limited to, current transformers, voltages across or through components, turns of wire, magnetic sensors, etc. As mentioned above, although not required for the present invention, some applications and/or embodiments may use level shifters, optocouplers, opto-isolators, transistors, etc. as part of the feedback. The present invention may or may not use such level shifting and is, in no way or form, limited to the use or non-use of level shifting, etc. The variable pulse generator may further be controlled by the current level through the switch as measured by another sense resistor 608 or other means. A snubber circuit may be included to suppress transient voltages and improve noise performance, etc. One or more clamp circuits may also be used. As mentioned above, the energy and associated power with the snubber(s) and/or clamp(s) may be used as part of the multiple power sources. An EMI filter may be included to reduce electromagnetic interference which, in some embodiments, may also be used for energy recovery, and a fuse 612 may be included to protect against short circuits, etc. In some configurations it may be possible to use the EMI filter as a power source.

FIG. 7 shows an example of the AC current for a driver of the type depicted in FIG. 6 without the present invention. Such a driver may have a THD higher than desired or above the allowed agency and regulatory limits and specifications.

Figure 8:
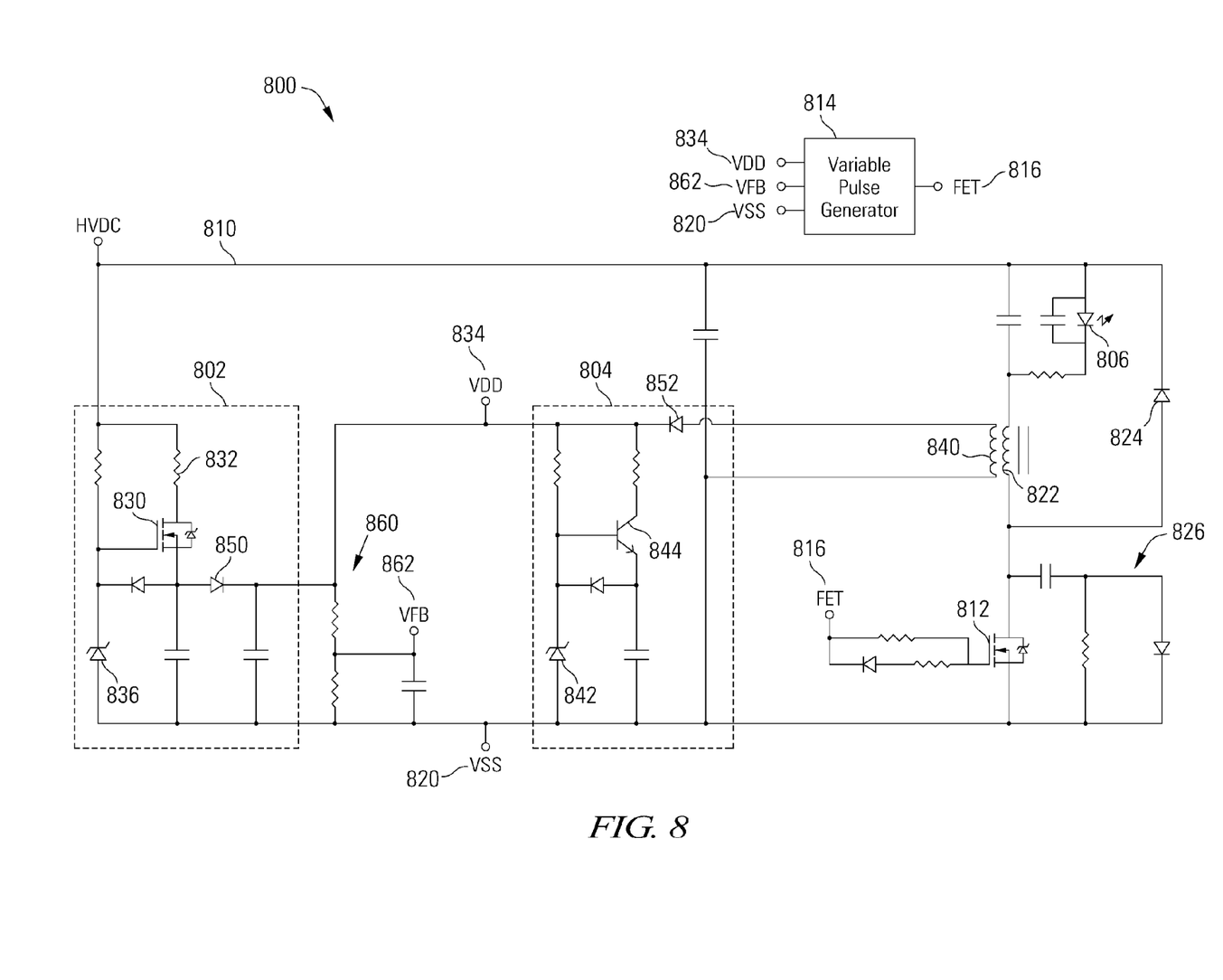
FIG. 8 depicts a schematic of a dimmable LED driver with multiple power paths and power sources, including a tag-along inductor, in accordance with some embodiments of the present invention for which FIG. 4 or 5 can be applied of the present invention.

An example embodiment of a dimmable LED driver 800 with multiple power sources 802 and 804 is illustrated in FIG. 8, with a high voltage DC power input 810 supplied from a power circuit such as those shown in FIG. 4 and/or 5. For example, the example implementations depicted in FIGS. 4 and 5 may be connected to the example dimmable driver illustrated in FIG. 8 at the HVDC 810 and VSS (GND) 820 points, respectively.

The dimmable LED driver 800 powers and controls a load such as one or more LED lights 806, from a power source such as a DC rail 810. A transistor 812 is controlled by a variable pulse generator 814 or other control circuit through a FET control signal 816, blocking or allowing current to flow from the DC rail 810 to a ground 820 through the transistor 812. Again, in this example embodiment, as current flows through the transistor 812, it also flows through a series inductor 822, storing energy in the inductor 822. When the transistor 812 is turned off by the variable pulse generator 814, the inductor 822 releases energy, which then circulates through a diode 824 or other secondary path and through the LED 806.

Other components may be included, such as a snubber circuit 826. One or more optional capacitors may be connected in parallel with the load as shown. Again, these other components may be also used as a power source.

In the first power source 802, current flows through a transistor 830 and resistor 832 to a VDD voltage node 834. A Zener diode 836 limits and sets the voltage level that may be supplied by the power source 802.

In the second power source 804, current flows from an inductor 840 wound with inductor 822 to the VDD voltage node 834, with the voltage supplied by the power source 804 set and limited by a Zener diode 842 and voltage regulating transistor 844. Notably, in embodiments where regulation is not needed, the voltage regulating transistor 844 and associated components are not included, and the VDD voltage node 834 is driven directly from inductor 840 through diode 852. Similar changes may be made in power source 802.

The selection of one or both power sources 802 or 804 to supply VDD voltage node 834 is set by diodes 850 and 852. If the voltage from power source 802 is greater than that from power source 804, the diode 852 in power source 804 will be reverse biased and power source 804 will not supply current to VDD voltage node 834. If the voltage from power source 804 is greater than that from power source 802, the diode 850 in power source 802 will be reverse biased and the power source 802 will not supply current to VDD voltage node 834. Although the selection of power sources and power paths in the above example embodiments involved diodes, the present invention is in no way limited to the use of diodes only; the selection can be made, for example, by diodes, switches, transistors, other types of semiconductor and active and passive components, digital and/or analog methods, techniques, approaches, etc., by monitoring and selecting certain voltage values, etc. These examples are meant to be illustrative and in no way or form limiting for the present invention.

Figure 10:
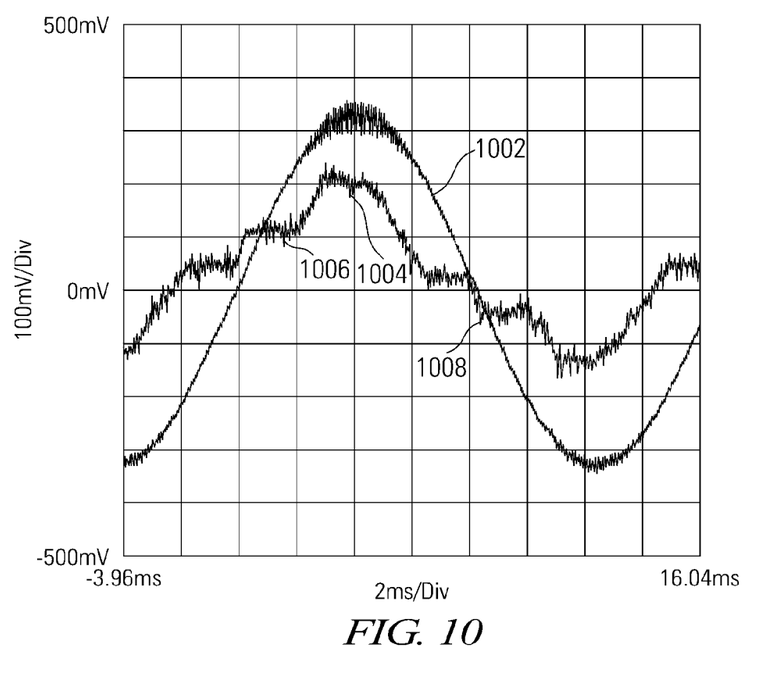
FIG. 10 shows a measurement of a dimming or non-dimming driver similar to the block diagram and schematic of FIGS. 6 and 8, respectively, with the present invention.
Figure 11:
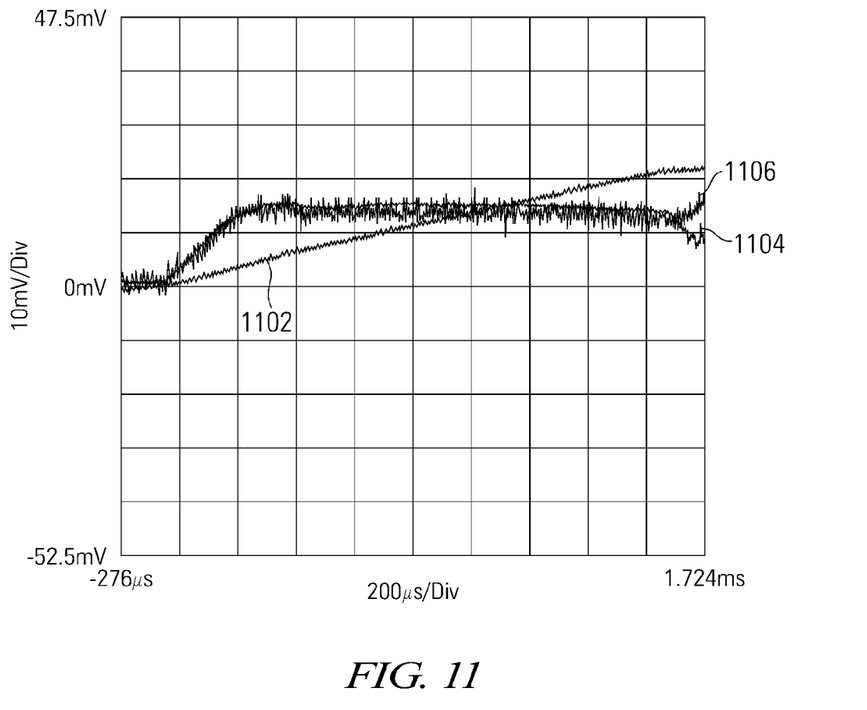
FIG. 11 shows an expanded view measurement of a dimming or non-dimming driver similar to the block diagram and schematic of FIGS. 6 and 8, respectively, with an embodiment of the present invention incorporated.

FIG. 9 shows the AC input current waveform for a driver representative of the drivers shown in FIGS. 6 and 8 that have relatively high LED forward voltages without the present invention. FIGS. 10 and 11 show the associated AC input current and input voltage waveforms along with the current through the voltage doubler for a driver representative of the drivers shown in FIGS. 6 and 8. In FIG. 10, trace 1002 is the AC input sine wave voltage. The voltage at point 1004 of the output waveform is substantially provided by the input current path through the diode rectifier bridge, while the voltages at points 1006 and 1008 are substantially provided by the input current path through the voltage doubler. In FIG. 11, a portion of the AC input sine wave is shown in trace 1102, the input current through the voltage doubler is shown in trace 1104, and the total AC input current is shown in trace 1106. The associated power factor and THD without the present invention are 0.91 and 44%, respectively and 0.93 and 27%, respectively with the present invention in the figures shown; other values of power factor and THD, including higher power factor and lower THD may be obtained with the present invention and the present invention is not restricted nor limited in any way or form to the numerical values listed for power factor and THD herein. The present invention can also include passive and active components and circuits that assist, support, facilitate, etc. the operation and function of the present invention. Such components can include passive components such as resistors, capacitors, inductors, filters, transformers, diodes, other magnetics, combinations of these, etc. and active components such as switches, transistors, integrated circuits, including ASICs, microcontrollers, microprocessors, digital signal processors (DSPs), field programmable gate arrays (FPGAs), complex logic devices (CLDS), programmable logic, digital and or analog circuits, and combinations of these, etc. and as also discussed below.

The present invention can be used in, among other things, power supplies, drivers, ballasts, etc. with or needing high power factor (PF) and/or lower THD circuits with or without dimming including triac, forward and reverse dimmers, 0 to 10 V dimming, powerline dimming, wireless (including but not limited to WiFi, WiMax, ZigBee, IEEE 801, ISM, GSM, Bluetooth, etc.—essentially any wireless signal, frequency, protocol, etc. including radio frequency and optical (i.e., infrared)) and other wired dimming, DALI dimming, PWM dimming, DMX, etc., as well as any other dimming and control protocol, interface, standard, circuit, arrangement, hardware, etc.

A dimmable LED driver with multiple power sources may also be used in embodiments having a load below the main inductor. As before, a capacitor may be connected in parallel with the load. The dimmable LED driver powers the load from an alternating current (AC) input. A feedback loop based on the current through, for example, a switch causes, as an example but in no way limiting or limited to, a variable pulse generator to control the switch to adjust the current through the switch and, therefore, through the load. The AC input is rectified in a rectifier such as a diode bridge and may be conditioned using a capacitor. An electromagnetic interference (EMI) filter may be connected to the AC input to reduce interference, and a fuse may be used to protect the dimmable LED power supply and wiring from excessive current due to short circuits or other fault conditions. In some embodiments, a short circuit protection may be employed in addition to fuse protection, etc.

Current to the load can be regulated or controlled by a switch such as a transistor or other switch, under the control of a variable pulse generator. A sense resistor is placed in series with the switch or in any other suitable location to detect the current through the switch or any other desired current, for use in controlling the switch. The main inductor is connected in series with the switch, and the load and a parallel capacitor are also connected in series with the switch and the main inductor. A diode is connected between the system ground and a local ground. When the switch is turned on, current flows from the positive rail through the switch and through the load and energy is stored in the main inductor. When the switch is turned off, energy stored in the main inductor is released through the load, with the diode providing a return path for the current through the load and back through the sense resistor and the main inductor.

The example embodiments disclosed herein illustrate certain features of the present invention and not limiting in any way, form or function of present invention. Note that linear or switching voltage or current regulators or any combination can be used in the present invention and other elements/components can be used in place of the diodes, etc.

The present invention is, likewise, not limited in materials choices including semiconductor materials such as, but not limited to, silicon (Si), silicon carbide (SiC), silicon on insulator (SOI), other silicon combination and alloys such as silicon germanium (SiGe), etc., diamond, graphene, gallium nitride (GaN) and GaN-based materials, gallium arsenide (GaAs) and GaAs-based materials, etc. The present invention can include any type of switching elements including, but not limited to, field effect transistors (FETs) such as metal oxide semiconductor field effect transistors (MOSFETs) including either p-channel or n-channel MOSFETs, junction field effect transistors (JFETs), metal emitter semiconductor field effect transistors, etc. again, either p-channel or n-channel or both, bipolar junction transistors (BJTs), either p-channel or n-channel or both, heterojunction bipolar transistors (HBTs), high electron mobility transistors (HEMTs), unijunction transistors, modulation doped field effect transistors (MODFETs), Darlington transistors, GaN-based (GANFET), SiC-based (SiCFET) etc., again, in general, n-channel or p-channel or both, vacuum tubes including diodes, triodes, tetrodes, pentodes, etc. and any other type of switch, etc. The present invention can, for example, be used with any type of power supply configuration and topology, including but not limited to, continuous conduction mode (CCM), critical conduction mode (CRM), discontinuous conduction mode (DCM), resonant modes, etc., of operation with any type of circuit topology including but not limited to buck, boost, buck-boost, boost-buck, cuk, etc., forward converters including, but not limited to, voltage mode and current mode, push-pull, etc., SEPIC, flyback, isolated or non-isolated power supplies, drivers, ballasts, chargers, etc. The present invention applies to all types of power supplies and sources and the respective power supply(ies) can be of a constant frequency, variable frequency, constant on time, constant off time, variable on time, variable off time, constant period, variable period, etc. Other forms of sources of power including thermal, optical, solar, radiated, mechanical energy, vibrational energy, thermionic, etc. are also included under the present invention. The present invention may be implemented in various and numerous forms and types including those involving integrated circuits (ICs) and discrete components and/or both. The present invention may be incorporated, in part or whole, into an IC, etc.

The present invention supports all standards and conventions for 0 to 10 V dimming or other dimming techniques. In addition the present invention can support, for example, overcurrent, overvoltage, short circuit, and over-temperature protection.

Other embodiments can use other types of comparators and comparator configurations, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices, field programmable gate arrays, etc.

The dimmer for dimmable drivers may use and be configured in continuous conduction mode (CCM), critical conduction mode (CRM), discontinuous conduction mode (DCM), resonant conduction modes, etc., with any type of circuit topology including but not limited to buck, boost, buck-boost, boost-buck, cuk, SEPIC, flyback, forward-converters, etc. The present invention works with both isolated and non-isolated designs including, but not limited to, buck, boost-buck, buck-boost, boost, flyback and forward-converters. The present invention itself may also be non-isolated or isolated, for example using a tag-along inductor or transformer winding or other isolating techniques, including, but not limited to, transformers including signal, gate, isolation, etc. transformers, optoisolators, optocouplers, etc.

The present invention includes other implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), digital signal processors (DSPs), field programmable gate arrays (FPGAs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc.

The present invention can also incorporate at an appropriate location or locations one or more thermistors (i.e., either of a negative temperature coefficient [NTC] or a positive temperature coefficient [PTC]) to provide temperature-based load current limiting.

When the temperature rises at the selected monitoring point(s), the phase dimming of the present invention can be designed and implemented to drop, for example, by a factor of, for example, two. The output power, no matter where the circuit was originally in the dimming cycle, will also drop/decrease by a some factor. Values other than a factor of two (i.e., 50%) can also be used and are easily implemented in the present invention by, for example, changing components of the example circuits described here for the present invention. As an example, a resistor change would allow and result in a different phase/power decrease than a factor of two. The present invention can be made to have a rather instant more digital-like decrease in output power or a more gradual analog-like decrease, including, for example, a linear decrease in output phase or power once, for example, the temperature or other stimulus/signal(s) trigger/activate this thermal or other signal control.

In other embodiments, other temperature sensors may be used or connected to the circuit in other locations. The present invention also supports external dimming by, for example, an external analog and/or digital signal input. One or more of the embodiments discussed above may be used in practice either combined or separately including having and supporting both 0 to 10 V and digital dimming. The present invention can also have very high power factor. The present invention can also be used to support dimming of a number of circuits, drivers, etc. including in parallel configurations. For example, more than one driver can be put together, grouped together with the present invention. Groupings can be done such that, for example, half of the dimmers are forward dimmers and half of the dimmers are reverse dimmers. Again, the present invention allows easy selection between forward and reverse dimming that can be performed manually, automatically, dynamically, algorithmically, can employ smart and intelligent dimming decisions, artificial intelligence, remote control, remote dimming, etc.

The present invention may provide thermal control or other types of control to, for example, a dimming LED driver. For example, the circuit of FIGS. 6 and 8 or variations thereof may also be adapted to provide overvoltage or overcurrent protection, short circuit protection for, for example, a dimming LED driver, or to override and cut the phase and power to the dimming LED driver(s) based on any type of internal and/or external signal(s) including arbitrary external signal(s) and/or stimulus. The present invention can also include circuit breakers including solid state circuit breakers and other devices, circuits, systems, etc. That limit or trip in the event of an overload condition/situation. The present invention can also include, for example analog or digital controls including but not limited to wired (i.e., 0 to 10 V, RS 232, RS485, IEEE standards, SPI, I2C, USB, other serial and parallel standards and interfaces, etc.), wireless, powerline, etc. and can be implemented in any part of the circuit for the present invention. The present invention can be used with a buck, a buck-boost, a boost-buck and/or a boost, flyback, or forward-converter design etc., topology, implementation, etc.

Other embodiments can use comparators, other op amp configurations and circuits, including but not limited to error amplifiers, summing amplifiers, log amplifiers, integrating amplifiers, averaging amplifiers, differentiators and differentiating amplifiers, etc. and/or other digital and analog circuits, microcontrollers, microprocessors, complex logic devices, field programmable gate arrays, etc.

The present invention includes implementations that contain various other control circuits including, but not limited to, linear, square, square-root, power-law, sine, cosine, other trigonometric functions, logarithmic, exponential, cubic, cube root, hyperbolic, etc. in addition to error, difference, summing, integrating, differentiators, etc. type of op amps. In addition, logic, including digital and Boolean logic such as AND, NOT (inverter), OR, Exclusive OR gates, etc., complex logic devices (CLDs), field programmable gate arrays (FPGAs), digital signal processors (DSPs), microcontrollers, microprocessors, application specific integrated circuits (ASICs), etc. can also be used either alone or in combinations including analog and digital combinations for the present invention. The present invention can be incorporated into an integrated circuit, be an integrated circuit, etc.

In conclusion, the present invention provides novel apparatuses and methods for supplying circuits from multiple power sources in dimmable LED drivers and in other applications. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A power supply, comprising:
   an alternating current input;
   a rectifier operable to generate a rectified signal based on the alternating current input;
   a voltage multiplier operable to generate a multiplied voltage based on the alternating current input; and
   an output operable to yield an electrical current based on the rectified signal from the rectifier and on the multiplied voltage from the voltage multiplier, wherein the rectified signal from the rectifier is connected to the output when a voltage of the rectified signal is higher than the multiplied voltage, and the multiplied voltage from the voltage multiplier is connected to the output when the multiplied voltage is higher than the voltage of the rectified signal.

2. The power supply of claim 1, wherein the multiplied voltage contributes to the electrical current at the output only during a portion of a cycle at the alternating current input.

3. The power supply of claim 1, wherein the output is automatically switched between the rectified signal from the rectifier and the multiplied voltage from the voltage multiplier during a cycle at the alternating current input.

4. The power supply of claim 3, wherein the automatic switching is performed by passive circuit components.

5. The power supply of claim 4, wherein the automatic switching is performed by diodes.

6. The power supply of claim 1, wherein the voltage multiplier comprises a voltage doubler.

7. The power supply of claim 1, wherein the voltage multiplier comprises a first diode with an anode connected to a first conductor of the alternating current input, a second diode with a cathode connected to the first conductor of the alternating current input, a pair of capacitors connected between the first diode and the second diode, and wherein a second conductor of the alternating current input is connected between the pair of capacitors.

8. The power supply of claim 1, wherein the rectifier comprises a full diode bridge.

9. The power supply of claim 1, further comprising a first diode connected between the rectifier and the output and a second diode connected between the voltage multiplier and the output.

10. The power supply of claim 1, further comprising a DC to DC converter operable to regulate the electrical current at the output.

11. The power supply of claim 1, further comprising a driver circuit connected to the output.

12. The power supply of claim 11, wherein the driver circuit comprises a lighting driver.

13. The power supply of claim 12, wherein the lighting driver comprises a light emitting diode driver.

14. The power supply of claim 1, further comprising a lighting ballast connected to the output.

15. The power supply of claim 1, further comprising a battery charger connected to the output.

16. A power supply, comprising:
an alternating current input comprising a first conductor and a second conductor;
a power output;
a rectifier connected to the alternating current input and having a rectified output;
a voltage multiplier connected to the first conductor and the second conductor of the alternating current input and having a voltage multiplied output;
a first diode connected between the rectified output and the power output; and
a second diode connected between the voltage multiplied output and the power output, wherein the rectified output is connected to the power output when a voltage of the rectified output is higher than the voltage multiplied output, and the voltage multiplied output is connected to the power output when the voltage multiplied output is higher than the voltage of the rectified output.

17. The power supply of claim 16, wherein the voltage multiplier comprises a third diode having an anode connected to the first conductor, a fourth diode having a cathode connected to the second conductor, a pair of capacitors connected between the third diode and the fourth diode, wherein the second conductor is connected between the pair of capacitors.

18. The power supply of claim 16, further comprising a lighting driver circuit connected to the power output.

19. The power supply of claim 16, further comprising a lighting ballast connected to the power output.

* * * * *